(12) United States Patent
Lysen

(10) Patent No.: US 7,513,162 B2
(45) Date of Patent: Apr. 7, 2009

(54) VIBRATION SENSOR OR MEASUREMENT DETECTOR

(75) Inventor: Heinrich Lysen, Garching (DE)

(73) Assignee: Prueftechnik Dieter Busch AG, Ismaning (DE)

( * ) Notice: Subject to any disclaimer, the term of this patent is extended or adjusted under 35 U.S.C. 154(b) by 103 days.

(21) Appl. No.: 11/279,761

(22) Filed: Apr. 14, 2006

(65) Prior Publication Data
US 2006/0207331 A1    Sep. 21, 2006

(30) Foreign Application Priority Data
Mar. 16, 2005    (DE) .................. 10 2005 012 466

(51) Int. Cl.
*G01N 29/00*    (2006.01)
*H02G 1/08*    (2006.01)
(52) U.S. Cl. .................. 73/649; 73/862.41; 174/66
(58) Field of Classification Search .................. 73/649, 73/862.192, 862.193, 654, 862.41; 174/66
See application file for complete search history.

(56) References Cited
U.S. PATENT DOCUMENTS
4,893,007 A * 1/1990 Stannow et al. ........ 250/231.13

6,695,483 B2 * 2/2004 Sakatani et al. ............. 384/448
7,124,045 B2 * 10/2006 Yamamoto et al. .......... 702/100
7,312,602 B2 * 12/2007 Hoopengarner ............. 324/115
2004/0188127 A1    9/2004 Braun et al.
2004/0244210 A1 * 12/2004 Harrer ........................ 33/1 PT
2006/0131490 A1 *  6/2006 Riepertinger .......... 250/231.13

FOREIGN PATENT DOCUMENTS
DE    203 01 106 UL    5/2003
EP    0 776 065 A1    5/1997
JP    10-222300 A  *  8/1998

* cited by examiner

*Primary Examiner*—Hezron Williams
*Assistant Examiner*—J M Saint-Surin
(74) *Attorney, Agent, or Firm*—David S. Safran; Roberts Mlotkowski Safran & Cole, P.C.

(57) ABSTRACT

Vibration sensors or measurement detectors having connecting cables (40) for electrical supply voltages and/or signal voltages are provided with a clamping or winding space (42) on the bottom of the sensor housing (10). One or more turns of the respective connecting cable is deposited with in the clamping or winding space when the sensors are screwed tightly onto a machine or the like. The connecting cable can have any optional azimuth angle relative to the sensor coordinates and is well protected against external, damaging mechanical effects.

10 Claims, 1 Drawing Sheet

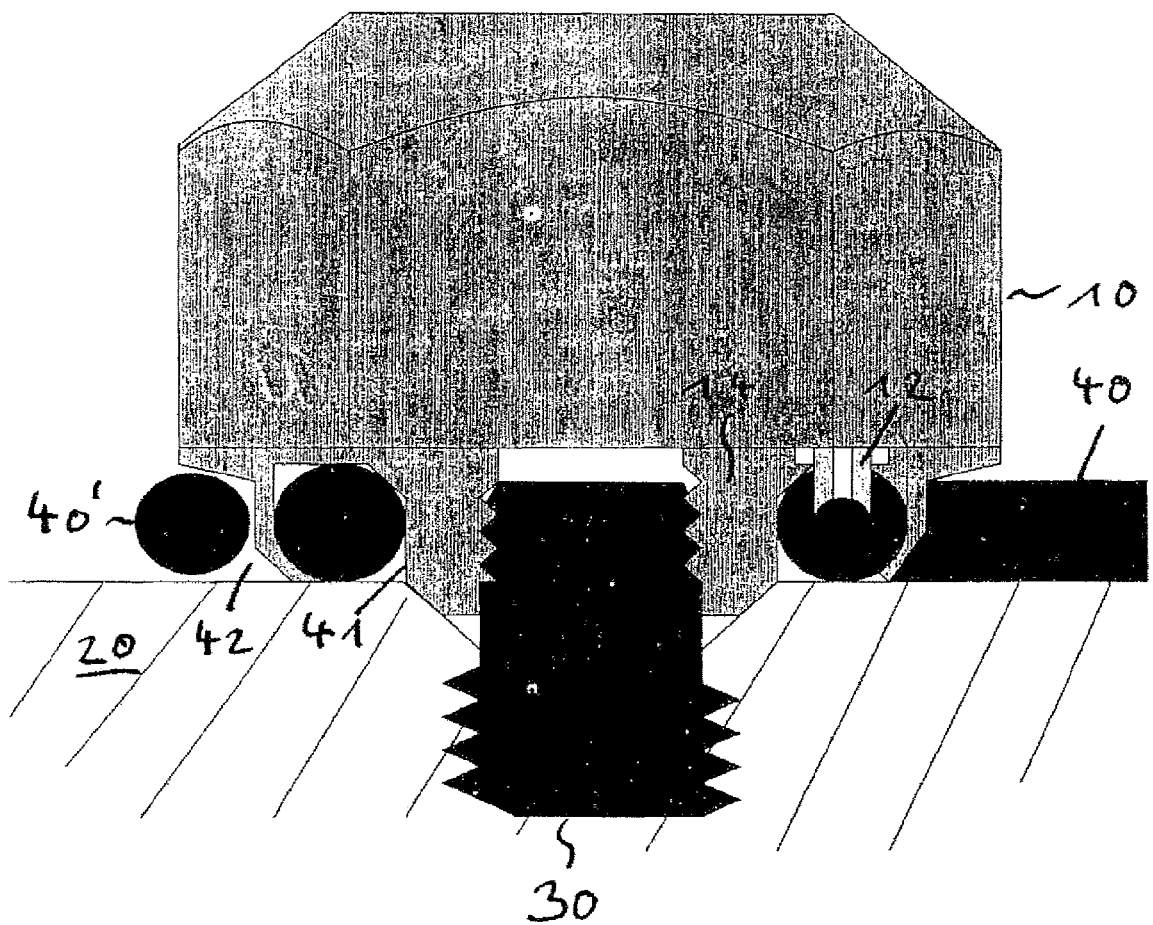

VIBRATION SENSOR OR MEASUREMENT DETECTOR

BACKGROUND OF THE INVENTION

1. Field of the Invention

This invention relates to a vibration sensor or measurement detector in an ergonomically advantageous configuration.

2. Description of Related Art

When vibration sensors or accelerometers are attached and mounted on machines, it is always important to properly install and secure the pertinent connecting wires or cables, so that the signals to be measured are not adulterated by the natural motion of the cable. On the other hand, the time required for this proper installation and placement of cables should be as small as possible. To a certain extent, conventional vibration sensors and accelerometers are subject to problems here, in particular, for hurried installation the cables of the vibration sensors can even be unintentionally damaged, especially those which are attached securely to a sensor.

German Utility Model DE 20301106 discloses a device with which it is possible in a relatively simple manner to avoid installation-induced damage of connecting cables of the aforementioned sensors. This applies especially to sensors with laterally emerging cable. In any case, a special additional part is necessary, and the sensors should also have a modified connecting thread for the embodiment shown there.

SUMMARY OF THE INVENTION

This invention solves the problem of the prior device in a clever, and moreover, economical manner.

The invention is characterized especially by a vibration sensor or a measurement detector with a connecting cable for electrical supply and/or signal voltages. In particular, there is a clamping or winding space on the bottom of the sensor housing, into which the connecting cable can be deposited with one or more turns, and one or more turns lying in a single plane. In this regard, the connecting cable should emerge to the outside in a tangential direction (relative to one or more turns) from the clamping or winding space.

According to conventional technology, connecting cables of vibration sensors or accelerometers are mounted either coaxially to the lengthwise axis of such a sensor and can be permanently attached, or can be connected by means of a coaxial plug connection, or are supplied from the side, therefore emerge in the radial direction. In the latter case a fixed cable attachment is preferred. The invention deviates radically from this technology which has been used for decades and is now based on the emergence of the connection cables tangentially to the side on the sensor. Moreover, this is to take place in conjunction with a device which is located on the sensor and which makes it possible to proportionally deposit the respectively pertinent connecting cable in a winding chamber when these sensors are screwed in properly. With this measure therefore, on the one hand, damage to the connecting cable when a sensor is mounted is effectively prevented, on the other hand, at the same time, a strain relief mechanism is provided which also works to prevent kinking. Attachment of sensors equipped in accordance with the invention is made especially simple and time-saving, with subsequently correct installation, and if necessary, securing of the pertinent connecting cable. Moreover, the cable feed provided in accordance with the invention, even after completion of installation efforts for such a sensor, constitutes improved protection against unintentional tearing-off or damage of these connecting cables.

The invention is explained below with reference to the accompanying drawings.

BRIEF DESCRIPTION OF THE DRAWINGS

The sole FIGURE is a cross-sectional view of a vibration sensor in accordance with the invention.

DETAILED DESCRIPTION OF THE INVENTION

Within the sensor housing 10, there is a vibration sensor or accelerometer which is not explained in detail here for reasons of clarity and can be of any conventional design. On the bottom of the sensor housing is an attachment gland 14 which is provided, for example, with an inside thread and which, in a conventional manner, can be screwed onto a threaded connecting pin 30, and thus, to the surface of the machine part 20. Instead of the attachment gland, the sensor housing can also be provided with an externally threaded measurement pin; both alternatives are possible for this invention. With a contact-making pin 12, the signal voltage delivered by the sensor is connected to the inside conductor of the coaxial cable, while the corresponding outside conductor makes contact with the housing of the sensor or preferably with an additional connecting element. Then, roughly one half turn of the coaxial cable is deposited in the cable chamber 41 and is thus routed there such that it can leave the cable chamber in a roughly tangential direction through an opening or recess to the outside. The coaxial cable can thus be wound with one or more turns when the sensor is screwed tight in the clamping or winding space 42. This aspect constitutes an important part of the invention. The clamping space 42 is located outside viewed radially relative to the cable chamber 41.

The clamping space 42 is dimensioned such that at least one turn, preferably two or more turns of the cable 40 (in cross section identified by reference number 40') can be accommodated. The height of the clamping space is preferably such that the cable 40 is held in position by slight pressure on its top or bottom (therefore, for example, in its radial direction). However, on the other hand, cable 40 can also be wound or unwound manually around the sensor without damage. Therefore, the connecting cable, when the vibration sensor or measurement detector has been securely screwed in, is also protected, for example, by means of predefined loading in the direction of its diameter and the corresponding slight deformation against unintentional uncoiling from its intended position; in particular, it cannot give rise to any fault signal voltages with vibrations of the machine to be measured.

As is apparent, the cable 40 can be routed out from any angular position from the sensor in the tangential direction. Moreover, the cable 40 can be installed immediately and directly over the surface of the machine part 20 so that it is protected in the best possible manner against damage by moving parts or tools, especially when it is additionally fixed by means of adhesive tape or the like to the machine which is to be checked and is additionally protected.

What is claimed is:

1. Vibration sensor or measurement detector, comprising:
    a connecting cable for at least one of electrical supply voltages and signal voltages,
    a sensor housing with a clamping or winding space on a bottom of the sensor housing into which at least one turn of the connecting cable is receivable with the at least one turn lying in a single plane and the connecting cable emerging from the clamping or winding space to the outside in a tangential direction relative to the at least one turn of the connecting cable wherein the sensor housing has both a winding space and a clamping space, wherein the clamping space is located radially outward of the winding space, and wherein the sensor housing is attachable to machinery to be monitored in a direction perpendicular to the single plane in which said at least one turn lies so that a portion of the connecting cable in the clamping space is clamped against the machinery as the sensor housing is attached to the machinery.

2. Vibration sensor or measurement detector as claimed in claim 1, having an additional cable chamber which is located radially inside of the clamping or winding space.

3. Vibration sensor or measurement detector as claimed in claim 1, wherein the clamping and winding space is dimensioned and configured to cause winding of the connecting cable in a single plane as the vibration sensor or measurement detector is mounted by screwing it in.

4. Vibration sensor or measurement detector as claimed in claim 3, wherein the clamping and winding space is dimensioned and configured to protect the connecting cable against unintentional uncoiling by producing a predefined loading and deformation of the cable in a radial direction.

5. Vibration sensor or measurement detector as claimed in claim 1, wherein the bottom of the sensor housing has an attachment mechanism by which the sensor housing is attachable to machinery to be monitored.

6. Vibration sensor or measurement detector as claimed in claim 5, wherein the attachment mechanism comprises a threaded connecting pin.

7. Vibration sensor or measurement detector as claimed in claim 5, further comprising a contact-making pin for delivering a signal voltage from the sensor or measurement detector to the connecting cable in said winding space wherein the contact-making pin extends in an attachment direction of the sensor housing.

8. Vibration sensor or measurement detector as claimed in claim 1, further comprising a contact-making pin for delivering a signal voltage to the connecting cable in said winding space.

9. Vibration sensor or measurement detector as claimed in claim 1 further comprising a contact-making pin for delivering a signal voltage to the connecting cable in said winding space, said contact-making pin extending in said direction perpendicular to the single plane so as to make contact with the connecting cable as the sensor housing is attached to the machinery.

10. Vibration sensor or measurement detector as claimed in claim 9, wherein the connecting cable is a coaxial cable having an inside conductor and an outside conductor, wherein the contact-making pin delivers a signal voltage from the sensor or measurement detector to the inside conductor and wherein the outside conductor makes contact with the sensor housing or an additional connecting element.

* * * * *